United States Patent [19]

Seymour

[11] 4,082,530
[45] Apr. 4, 1978

[54] PRESS BENDING APPARATUS AND METHOD OF FABRICATION

[75] Inventor: Samuel L. Seymour, Oakmont, Pa.

[73] Assignee: PPG Industries, Inc., Pittsburgh, Pa.

[21] Appl. No.: 758,875

[22] Filed: Jan. 12, 1977

[51] Int. Cl.² ............................................. C03B 23/02
[52] U.S. Cl. ...................................... 65/273; 65/106; 65/275; 65/287
[58] Field of Search .................. 65/273, 275, 287, 106, 65/288, 289

[56] References Cited

U.S. PATENT DOCUMENTS

| 3,148,968 | 9/1964 | Cypher et al. | 65/106 |
| 3,367,764 | 2/1968 | Seymour | 65/291 |
| 3,871,857 | 3/1975 | Claassen | 65/275 X |

*Primary Examiner*—Arthur D. Kellogg
*Attorney, Agent, or Firm*—Dennis G. Millman; Edward I. Mates

[57] ABSTRACT

In an apparatus for press bending heat-softened glass sheets of the type which includes a shaping plate of adjustable curvature and means to adjust the curvature of the shaping plate, rigidity of the adjusted curvature is improved by providing edge reinforcing means for the adjustable shaping plate.

6 Claims, 2 Drawing Figures

PRESS BENDING APPARATUS AND METHOD OF FABRICATION

BACKGROUND OF THE INVENTION

This invention relates to the shaping of heat-softened glass sheets or the like by pressing the sheets between rigid pressing members of complementary curvature. This technique, known as press bending, lends itself to relatively inexpensive mass production of bent glass sheets within precise tolerances.

A particularly advantageous press bending apparatus is disclosed in U.S. Pat. No. 3,367,764 to S. L. Seymour. A feature of that patented apparatus is the provision of a relatively flexible shaping plate of adjustable curvature adjustably attached to a relatively rigid plate, so as to enable adjustments to the curvature of the shaping plate to be made simply and quickly. Adjustments are made possible by the use of a large number of threaded rods and nuts to attach the shaping plate to the rigid plate. By turning the nuts, the distance between a portion of the shaping plate and the rigid plate can be changed. While such an arrangement possesses many advantages, it would be desirable to reduce the time required to carry out the many adjustments needed to conform the curvature of the shaping plate to a given standard.

The flexible shaping plate can be more quickly and accurately adjusted by affixing the shaping plate to a rigid adjusting plate made up of a plurality of segments, as is shown and described in U.S. Pat. application Ser. No. 745,909 of Samuel L. Seymour, filed Nov. 29, 1976, now U.S. Pat. No. 4,052,188. Each segment of the adjusting plate carries a plurality of adjustable connectors which join the segment with a portion of the shaping plate. Each adjusting plate segment, in turn, is adjutably mounted onto a rigid back plate. Thus, small, localized changes in the shaping plate curvature may be made by adjusting the distance between points on the shaping plate and the adjusting plate by means of individual connectors, while major adjustments involving an entire zone of the shaping plate as a whole are carried out by reorienting one or more of the adjusting plate sections. By this arrangement, an overall curvature correction can be effected without disturbing each individual adjusting connector. For example, in a case where it is desired to slightly flatten the curvature of a compound curve in one direction only, the provision of sectionalized adjusting plates permits the adjustment to be carried out without disrupting the curvature in the other direction. The adjusting plate segments, although relatively rigid, can be flexed to some degree, which provides a second advantageous mode of adjustment. By slightly flexing one of the adjusting plate segments, the overall curvature of one region of the shaping plate can be smoothly altered without disrupting the curvature of the remainder of the shaping plate.

Notwithstanding the aforesaid enumerated inventions, shaping plates of adjustable curvature tended to depart from their desired shape with time as repeated, intermittent use in a mass production operation and mishandling during conveyance between an operating line and a storage area caused deviations from desired curvature of the shaping plates. Furthermore, these deviations from curvature seemed to occur with more frequency in shaping plates of press bending apparatus for fabricating relatively simple bends, that is, those of relatively simple cylindrical curvatures. These deviations from curvature were most frequently found in the vicinity of notched portions in the shaping plates. Such notched portions are needed along the upper edge of the shaping plates to provide clearances to receive the glass engaging elements of self-closing tongs from which glass sheets are suspended during a press bending operation.

SUMMARY OF THE INVENTION

It has now been found that the frequency and the severity of deviations from desired curvature of the shaping plate can be reduced considerably by providing edge reinforcing means along the upper edge portion that is provided with notched portions for tong clearance, according to one embodiment of this invention. In another embodiment, additional reinforcement means is provided along an edge portion in spaced relation to the reinforcement for the notched edge portion of the shaping plate. In case the shaping plate is shaped to a cylindrial curvature about a horizontal axis, reinforcing means may be provided along the upper notched edge portion and along the opposite lower edge portion, and preferably along substantially the entire length of said opposite upper and lower edge portions.

The modified shaping plate of the present invention is especially suitable for use with press bending apparatus of the type disclosed in the aforesaid U.S. Pat. No. 3,367,764 to Seymour, which is provided with a unitary adjusting plate as well as with modifications of the aforesaid press bending apparatus as will become obvious from a detailed description of a specific preferred embodiment that follows.

BRIEF DESCRIPTION OF THE DRAWINGS

In the drawings that form part of the detailed description of a specific embodiment of this invention, wherein like reference numbers refer to like structural elements.

DETAILED DESCRIPTION

Figure 1:
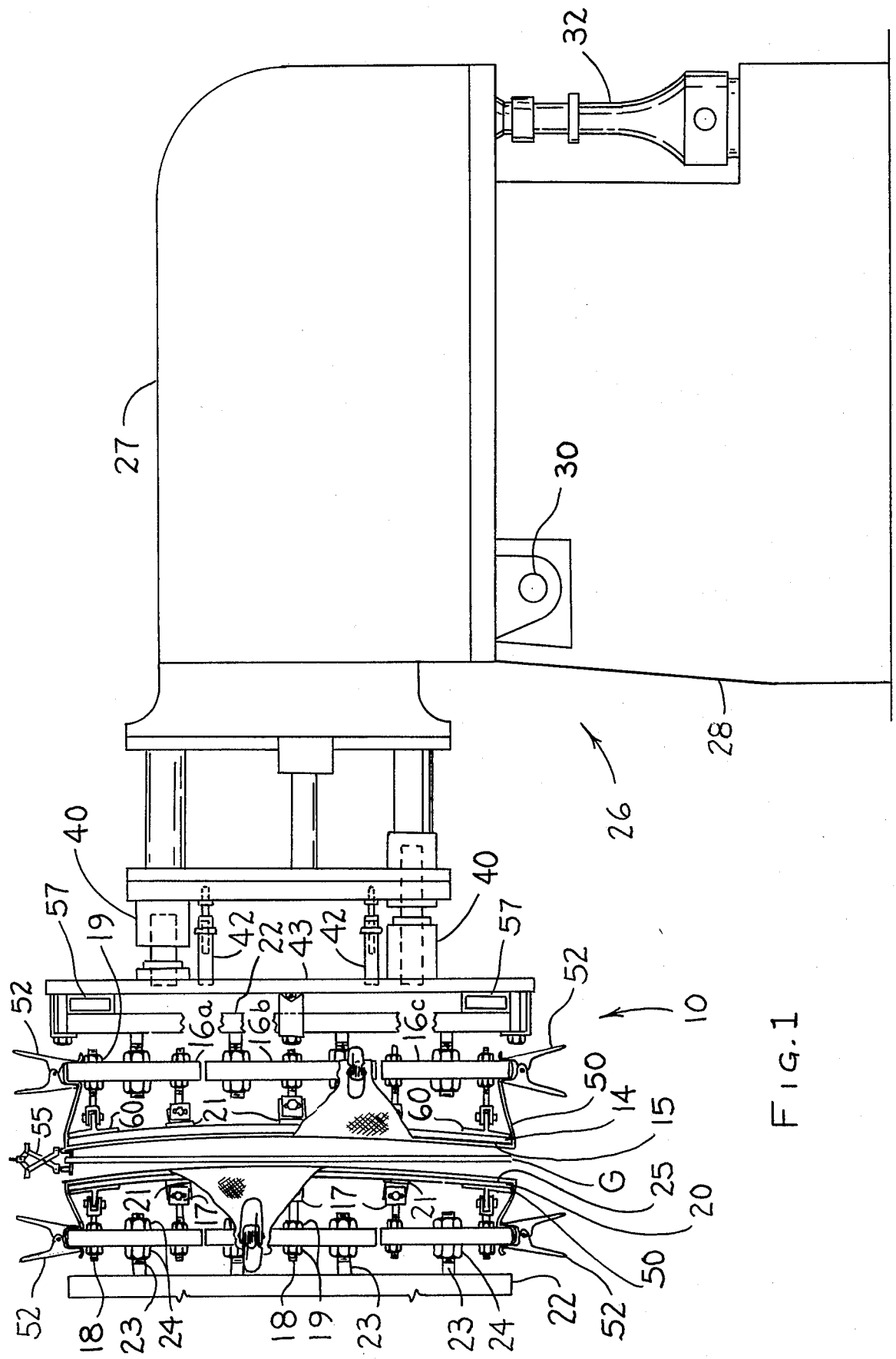
FIG. 1 is a fragmentary end view of a typical vertical press bending apparatus incorporating the improved shaping members of the present invention.

The glass bending apparatus shown in the drawings is based on that shown in the aforementioned U.S. Pat. No. 3,367,764 to Seymour. The details of the construction and operation of such an apparatus can be obtained from that patent, the disclosure of which is hereby incorporated by reference. Therefore, only a brief outline of that disclosure need be set forth here in order to understand the present invention.

Figure 2:
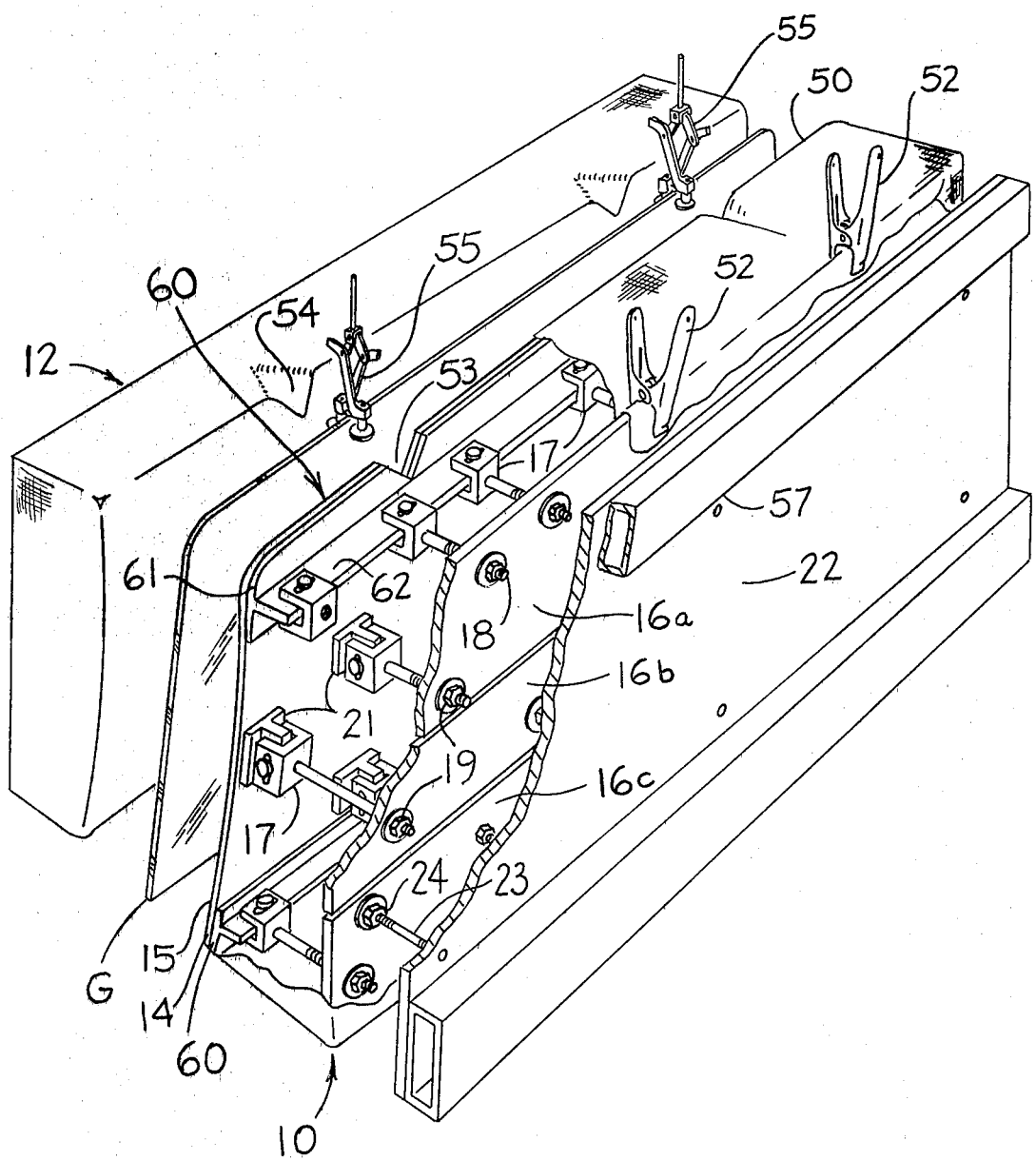
FIG. 2 is a perspective view of a pair of shaping members, each having a shaping plate modified according to this invention.

As shown in FIGS. 1 and 2, the bending apparatus comprises a concave shaping member 10 and a convex shaping member 12 The concave shaping member 10 is comprised of a relatively flexible shaping plate 14 having a concave shaping surface 15. Disposed behind the shaping plate 14 is a relatively rigid adjusting plate 16 in three rigid segments 16a, 16b, and 16c. The provision of three rigid segments as shown has been found to be particularly advantageous, but there need be only two or as many as four or more, as dictated by the size and curve complexity of the shape being produced. Although there is no specific upper limit to the number of segments, larger numbers increase the amount of aligning required and thereby diminish the benefits obtained.

The segments of the adjusting plate in the drawings have adjacent edges that extend along horizontal lines, but a vertical demarcation or some other configuration may be desirable in other cases. Adjustable connecting means between shaping plate 14 and adjusting plate 16 are provided by an array of connectors. Each connector comprises a threaded shaft 18 (only a representative number being shown in the drawings for the sake of clarity) attached to adjusting plate 16 with nuts 19 and to shaping plate 14 by means of a clevis 17 and a T-shaped member 21. By manipulating nuts 19, the distance between each portion of shaping plate 14 and the corresponding portion of rigid adjusting plate 16 interconnected by each connector can be varied, thereby changing the curvature of shaping surface 15. Each of the rigid adjusting plate segments is, in turn, adjustably fastened to a flat, rigid back plate 22 by means of a plurality of threaded rods 23 and nuts 24 (again, only a representation number are shown). The connections between the shaping plate and the adjusting plate generally outnumber the connections between the adjusting plate and the back plate. For press bending apparatus constructed and arranged to handle relatively small glass sheets, the adjusting plate 16 need not be segmented.

The convex shaping member 12 comprises a relatively flexible shaping plate 20 having a shaping surface 25 complementary to that of the concave shaping surface 15. The convex shaping member includes a rigid, segmented adjusting plate 16, a more rigid back plate 22, and adjustable attachment means corresponding to those of the concave shaping member 10, as indicated by like numerals in the drawings. The shaping surfaces 15 and 25 are correlated with the shape to be applied to be treated glass sheets as is appreciated by those skilled in the art.

Reciprocating motion is imparted to both the concave and convex shaping members 10 and 12 by a ram mechanism 26 engaging the back side of each shaping member (only one of which is shown in FIG. 1). Each ram mechanism includes a housing 27 which may be driven along a generally horizontal line on a stationary base 28. Slight angularity may be imparted to the reciprocation of the ram by means of a pivot 30 and a piston 32. Interposed between the ram housing 27 and the respective shaping member are impact absorbing means 40 and return springs 42. Each back plate 22 is removably clamped onto a frame member 43 on the ram mechanism.

Each shaping member is provided with a cover 50 in direct contact with shaping surface 15 or 25. The cover 50 is preferably of a material which does not harm glass at elevated temperatures. Preferably, the material for the cover is a stretchable fiber glass cloth composed of texturized yarn of the type depicted in U.S. Pat. No. 3,148,968 to Cypher and Valchar. A number of closely spaced clamps 52 grip the periphery of adjusting plate 16 to clamp the cover 50 in place. Portions of cover 50 are shown broken away in FIG. 1 to reveal details of the plate connecting means, and in FIG. 2, only part of the cover is shown, also.

Shaping plate 14 has a series of notched portions 53 along its upper edge and shaping plate 20 has corresponding notched portions 54 aligned with the notched portions 53. A sheet of heat-softened glass G suspended on a series of tongs 55 is conveyed into position between the parted shaping members. The shaping members are then pressed together to bend the glass to a shape correlated with the shaping surfaces 15 and 25. The tongs 55 are received in the notched portions 53 and 54 when the shaping members are brought together to engage the opposite surfaces of the glass sheet to bend the latter. When the shaping members separate again, the bent sheet of glass is conveyed away from the bending station by the tongs.

It should be understood that the shaping members depicted in FIGS. 1 and 2 are adapted for being provided with compound bends, that is, bends about axes angularly disposed relative to one another. However, the present invention is especially useful with press bending apparatus constructed and arranged to product a cylindrical bend, that is, a curve about one axis of bending only. It should also be apparent that the present invention is not limited to the vertical mode of press bending but can also be applied to bending operations where the sheets of glass are held in a generally horizontal orientation or even at an oblique orientation.

The terms "flexible" and "rigid" used herein to describe the plates which form the shaping members are, of course, relative terms and are intended merely to connote the stiffness of one plate relative to the stiffness of the other plates. In a typical glass bending apparatus ¼ inch (6.35 millimeters) thick hot rolled steel, for example, may be considered flexible in comparison with ½ inch (12.7 millimeters) thick cold rolled No. 1018 carbon steel, which in turn may be considered rigid. Extra rigidity may be imparted to back plate 22 by providing the latter with reinforcing braces such as tubular members 57. The "flexible" shaping plates 14 and 20 are considerably more rigid than the heat-softened glass sheets that are shaped by engagement therebetween. Hence, the flexible shaping plates tend to maintain their adjusted shape when engaging a heat-softened glass sheet to shape the latter.

The apparatus previously described represents the state of the art prior to the present invention. The present invention modifies the apparatus of the prior art by incorporating edge reinforcing means 60 attached to the reverse surface of each of the relatively flexible shaping plates 14 and 20. In a preferred embodiment of this invention, the edge reinforcing means is a longitudinally extending reinforcement bar of T section that extends sunstantially the entire length of the upper edge portion of shaping plate 14 that includes notches 53, and comprises a base or head 61 and a stem 62. A similar reinforcing means is attached in similar location to the reverse surface of flexible shaping plate 20 of convex shaping member 12. The reinforcing means extends longitudinally in a direction substantially aligned with an axis of bending defined by the shaping plates 14 and 20, which, in the specific embodiment illustrated, extends in a horizontal direction.

In fabricating press bending molds conforming to the present invention, the shaping plates 14 and 20 are pressed to the approximate shape desired betweed a pair of heavy die members. Then, the edge reinforcing means 60 in the form of a reinforcement bar of T section having a length substantially equal to the length of the flexible shaping plate 14 or 20 is spot welded to the reverse surface of the shaping plate with one of the longitudinally extending side edges of its head or base 61 aligned with the longitudinally extending edge of the shaping plate, and its stem 62 extending away from the reverse surface of the shaping plate. The shaping plates and the portion of each head or base 61 extending to the edge side of the shaping plate from the stem 62 are then cut to provide a series of notches 53 or 54 in positions required to receive glass supporting tongs therein when the glass engaging surfaces 15 and 25 close against the opposite major surfaces of a heat-softened glass sheet.

If desired, an additional edge reinforcing means 60 may be connected along the lower edge portion of the reverse surface of each shaping plate opposite the edge portion to be notched. Each shaping plate is connected through a series of connectors to an adjusting plate 16 and the connectors adjusted to adjust the shape of the attached shaping plate. Each adjusting plate has previously been connected to a rigid back plate 22. Covers 50 are clamped against the glass engaging surfaces 15 and 25 so as to provide a pair of complementary shaping members 10 and 12.

Reinforcing the edge of the shaping plate to be notched prior to the step of notching the upper edge of the shaping plate and its reinforcement is very important. Prior to the present invention, the step of applying notches to the flexible shaping plates caused the upper edge portion of the flexible shaping plate to become distorted. Consequently, when heat-softened glass sheets were shaped by press bending between distorted shaping plates, the glass sheets developed kinks and wrinkles in their upper edge portions, since the mode of adjusting the shape of the shaping plates provided in the press bending apparatus of the aforesaid Seymour patent did not permit correction for such deviations in the vicinity of the notches for receiving tongs. Reinforcing the upper edge before notching according to the teaching of this invention imparts sufficient rigidity to the upper edge portion of the shaping plate as to provide sufficient resistance to distortion in the edge portion of the shaping plate to eliminate this source of kinking in the shaped glass sheets.

The exact dimensions of the edge reinforcing means 60 depends upon the amount of stiffening desired and the overall size of the glass sheets undergoing shaping. In a typical apparatus, the head or base 61 is 1.25 inches (3.2 centimeters) wide and 3/16 inch (0.5 centimeter) thick, and the stem 62 extends normal to the reverse surface of the head or base 61 and has a width of 1.25 inch (3.2 centimeters) and a thickness of 3/16 inch (0.5 centimeter). The notches 53 and 54 have a maximum depth of ¾ inch (19 millimeters). It is understood that these dimensions are provided by way of example only.

Shaping members 10 and 12 that comprise shaping plates 14 and 20 shaped to compound curvatures (that is shapes comprising bends about two axes of bending angularly disposed to one another) are more rigid and less likely to become distorted than those comprising shaping plates of simple curvature, such as cylindrical shapes bent about a single axis of bending. The embodiment illustrated in FIGS. 1 and 2 shows shaping plates bent to cylindrical shapes about a horizontally extending axis of bending. In this embodiment, which is usually typical of the configuration of automobile sidelights, the upper edge reinforcing means 60 is supplemented by an additional reinforcing means 60 attached to the lower edge portion of the shaping plates so as to reinforce the substantially unbent upper and lower edge portions that extend substantially parallel to the axis of bending. The end edge portions that extend between the upper and lower edge portions are more resistant to deformation by virtue of their curvature. Hence, the end edge portions of this embodiment are preferably not reinforced.

In a typical embodiment wherein the glass is supported between shaping plates defining a simple curve about one or more axes of bending that extend horizontally, in addition to reinforcing the notched upper edge portion of the shaping plates, the end edge portions should be reinforced since the latter portions are relatively flat and more subject to distortion than the curved lower edge portion of the shaping plates. However, in order to provide adjustability to the shaping plates of the latter embodiment, it is recommended that the edge reinforcing means for the end edges be spaced from the upper edge reinforcing means so as to avoid any connection between the upper edge reinforcing means and the end edge reinforcing means forming an angular connection therebetween.

Prior described embodiments have reinforcing means extending along a straight line. However, the outline contour of certain glass sheet patterns that are shaped by press bending includes one or more curved edges. In some instances, it is necessary to suspend the glass sheet from tongs along a curved edge thereof and to provide the shaping plate with a notched upper edge portion that conforms to the curvature of the curved edge. Under such circumstances, the edge reinforcing means is curved along its length to conform to the notch curved upper portion of the shaping plate.

In all the embodiments described hereinbefore, additional edge reinforcement means spaced from the aforesaid upper notched edge reinforcing means may be provided to reinforce other edges of the shaping plate as experience dictates.

The form of the invention shown and described in this disclosure represents an illustrative preferred embodiment and certain modifications thereof. It is understood that various changes other than those enumerated previously may be made without departing from the gist of the invention as defined in the claimed subject matter that follos.

I claim:

1. Apparatus for shaping a heat-softened glass sheet comprising a relatively flexible shaping plate having a glass engaging surface correlated with the shape desired for said glass sheet, a relatively rigid adjusting plate, adjustable connecting means interconnecting spaced portions of said shaping plate to corresponding spaced portions of said adjusting plate in spaced relation therebetween and adjustable to change the shape of said shaping plate, characterized by edge reinforcing means attached to the reverse surface of said shaping plate opposite said glass engaging surface along substantially the entire length of an edge portion thereof, said reinforcing means extending longitudinally in a direction substantially aligned with said edge portion of said shaping plate.

2. Apparatus as in claim 1, wherein said shaping plate has a notched portion along its upper edge and said edge reinforcing means is attached to said reverse surface along the upper notched edge portion thereof.

3. Apparatus as in claim 2, further including additional edge reinforcing means attached to said reverse surface along an edge portion thereof in spaced relation to said edge reinforcing means attached along said upper notched surface.

4. Apparatus as in claim 3, further including additional edge reinforcing means attached to said reverse surface along the lower edge portion thereof.

5. A method of fabricating a press bending mold for shaping a glass sheet comprising a relatively flexible shaping plate having a glass receiving surface correlated with the shape desired for said glass sheet, a relatively rigid connecting plate and adjustable connecting means interconnecting spaced portions of said shaping plate and corresponding portions of said connecting plate, said method comprising impartng approximately the shape desired to said shaping plate, attaching edge reinforcing plate means to the back surface of said shaping plate along an edge portion thereof, cutting a tong-receiving notch through said shaping plate at an edge portion thereof which is reinforced with said edge reinforcing plate means so as to simultaneously cut through a portion of said edge reinforcing means thereby substantially avoiding distorting adjacent portions of said shaping plate, said reinforcing plate means extending inwardly from said edge portion a sufficient distance so that the notch extends into only a portion of said reinforcing plate means attaching said notched, reinforced shaping plate to said connecting plate through an array of adjustable connectors, and adjusting a selected one of said connectors to modify the shape of said shaping plate in portions thereof where adjustment is desired.

6. A method as in claim 5, wherein said edge reinforcing means is an elongated reinforcement bar of T section comprising a base or head and a stem, further comprising attaching said bar to said shaping plate with an edge of said base or head in substantial alignment with the upper edge of said shaping plate and wherein said notching step comprises notching a portion of the base or head that extends toward the edge of said shaping plate from said stem when said shaping plate is notched along said edge portion.

* * * * *